United States Patent
White

(10) Patent No.: US 6,729,037 B2
(45) Date of Patent: May 4, 2004

(54) FLEXIBLE MEASUREMENT DEVICE

(75) Inventor: Patrick White, Lignieres (CH)

(73) Assignee: Precimed S.A., Orvin (CH)

( * ) Notice: Subject to any disclaimer, the term of this patent is extended or adjusted under 35 U.S.C. 154(b) by 0 days.

(21) Appl. No.: 10/060,937

(22) Filed: Jan. 30, 2002

(65) Prior Publication Data

US 2002/0104230 A1 Aug. 8, 2002

Related U.S. Application Data

(60) Provisional application No. 60/265,661, filed on Jan. 31, 2001.

(51) Int. Cl.$^7$ .................................................. G01B 3/10
(52) U.S. Cl. .......................................... 33/755; 33/512
(58) Field of Search ........................... 33/755, 511, 512, 33/756, 759, 464, 809, 810, 812

(56) References Cited

U.S. PATENT DOCUMENTS

| | | | | |
|---|---|---|---|---|
| 3,478,435 A | * | 11/1969 | Cook ........................... | 33/511 |
| 4,270,274 A | * | 6/1981 | Hennessy .................... | 116/306 |
| 4,760,847 A | * | 8/1988 | Vaillancourt ................ | 128/907 |
| 4,779,349 A | * | 10/1988 | Odensten et al. ............. | 33/512 |
| 4,860,631 A | * | 8/1989 | Aoshiro ....................... | 33/719 |
| 5,013,318 A | * | 5/1991 | Spranza, III ................. | 33/512 |
| 5,593,405 A | * | 1/1997 | Osypka ........................ | 606/15 |
| 5,895,389 A | * | 4/1999 | Schenk et al. ............... | 606/102 |
| 6,200,274 B1 | * | 3/2001 | McNeirney .................. | 128/897 |
| 6,273,895 B1 | * | 8/2001 | Pinchuk et al. .............. | 606/108 |

* cited by examiner

*Primary Examiner*—Diego Gutierrez
*Assistant Examiner*—Tania C. Courson
(74) *Attorney, Agent, or Firm*—Bugnion S.A.; John Moetteli

(57) ABSTRACT

The invention is a depth gauge having standard components and improved in that a flexible shaft is mated to the tip. A probe is attached to the shaft. The flexible shaft allows for full angular adjustment for various directional approaches to the hole. The tip of the probe can be formed into a shape that conforms with a mating part through which the hole is measured. The probe is manufactured from a superelastic nickel titanium <<NITINOL>> alloy which has greater flexibility and elasticity than typical spring steels so that it doesn't permanently deform when the flexible shaft is bent. The nickel titanium probe also extends from the tip of the shaft in a direction perpendicular to the tip so it extends straight into the hole being measured even when the guide is off axis. The nickel titanium probe can be attached in several different ways to the depth gauge. For example, a setscrew could be used or a crimp. In this disclosure a nickel titanium coupling connector device is shown to hold the probe to the gauge.

15 Claims, 3 Drawing Sheets

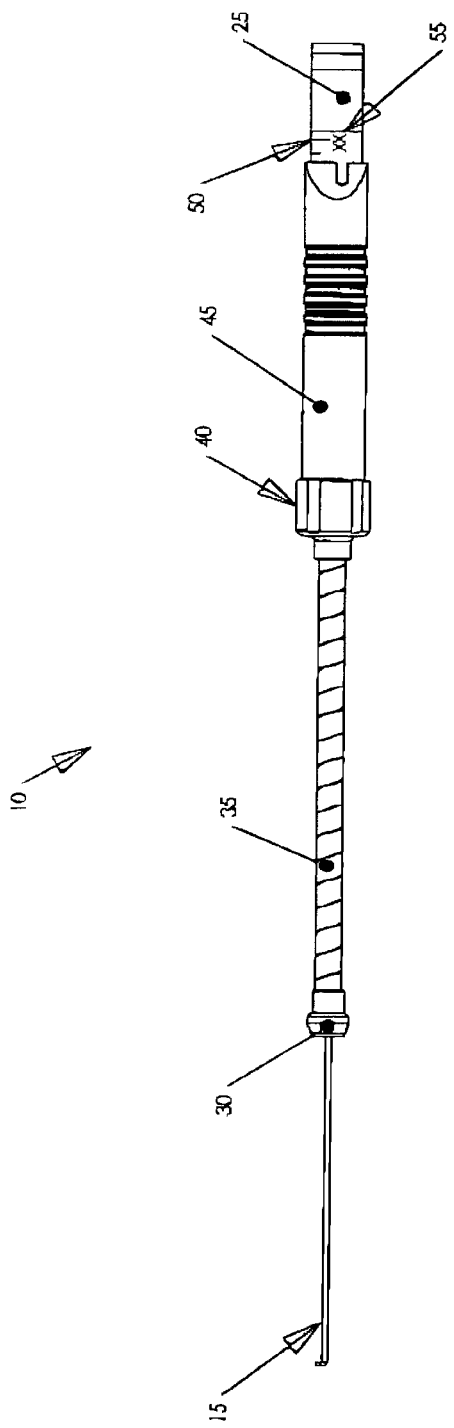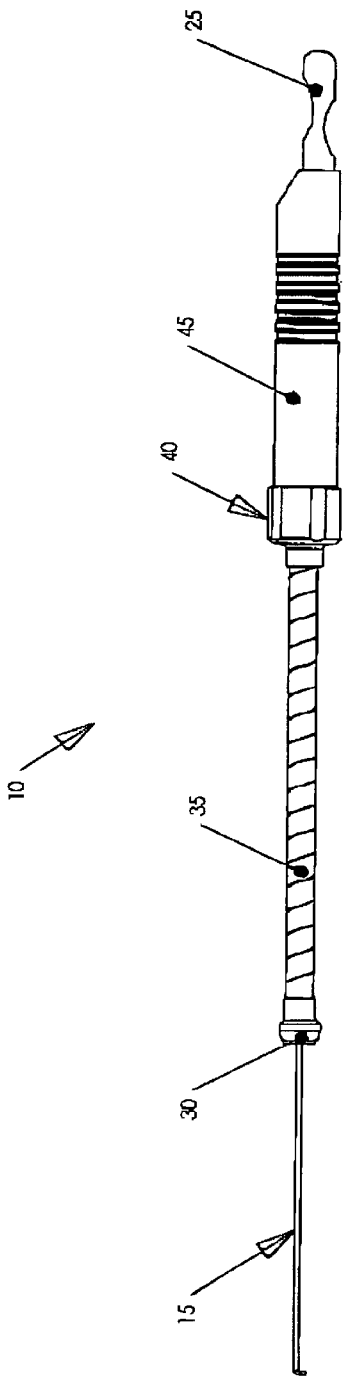

US 6,729,037 B2

FLEXIBLE MEASUREMENT DEVICE

CROSS REFERENCE TO RELATED APPLICATIONS

This application claims priority to U.S. provisional patent application No. 60/265,661, of the same title, filed on Jan. 31, 2001, the contents of which are incorporated herein by reference thereto.

BACKGROUND OF THE INVENTION

This invention generally relates to measurement devices or depth gauges for determining the depth of holes. Of particular interest are holes that are blind in nature. Existing measurement devices work very well for this application when there is direct linear access to the hole. However, when direct linear access is not available it is nearly impossible to make any measurements accurately since the existing devices must work on axis with the hole. There are many different industrial and medical applications where direct access to a hole is not possible. In one example an orthopedic surgeon may be working in the acetabular region of the human body. It is necessary in certain surgical procedures to predrill holes in the socket region, which is typically done using flexible drill bits since direct access is difficult. Once the holes are drilled it is necessary to measure their depth sometimes through an implant component placed previous to creating the holes. However, it is not possible to accurately measure the holes with the current instruments.

With the increased demand for a measurement device several companies have attempted to solve this problem by designing new instruments. In one design a flexible spring shaft is attached to the tip of the gauge and inside there is a small diameter flexible spring steel wire for the probe. This allows the tip to be flexible and measure off axis. However, when the flexible shaft is bent the probe inside made of the spring steel takes on a permanent curved shape. So, when the probe is extended out of the tip it comes out curved. After some time it is difficult to operate the instrument because of the permanent set in the wire and this idea has been abandoned. Another solution uses a flexible spring shaft attached to the tip of the gauge with a large diameter stainless steel probe. The probe is pre-bent with a fixed angle. This solid steel probe traverses inside the flexible shaft, so the bend will be in a different location along the spring depending on the depth of the measurement. The disadvantage of this system is that access to the holes being measured is limited to the pre-bent angle of the tip. This also requires the probe to be of a substantial diameter to maintain the pre-bent angle, which can pose a problem when measuring smaller diameter holes.

It is the primary aim of the present invention to provide a hole depth-measuring instrument that is safe and effective for use in surgical and industrial applications where off axis measurements are necessary. There is a further need to have an instrument that is flexible and can approach the holes being measured at variable angles. There is yet another need to have a small diameter probe for measuring small diameter holes. There is yet a further need to use a probe that is resilient but that will not permanently bend. There is still yet a further need to have a gauge wherein the probe protrudes form the guide in a direction perpendicular to the tip. Finally there is a need to have the tip of the guide made with an implant for measuring the depth of a hole placed through it.

SUMMARY OF THE INVENTION

To accomplish these objectives, a standard depth gauge with a flexible shaft mated to the tip is provided. The flexible shaft allows for full angular adjustment for various directional approaches to the hole. The tip of the shaft can be formed into a shape that conforms with a mating part through which the hole is measured. The probe is manufactured from a superelastic nickel titanium "NITINOL" alloy which has greater flexibility and elasticity than typical spring steels so that it doesn't deform when the flexible shaft is bent. The nickel titanium probe also extends from the tip of the shaft in a direction perpendicular to the tip so it extends straight into the hole being measured even when the guide is off axis. The nickel titanium probe can be attached in several different ways to the depth gauge. For example a setscrew or a crimp could be used.

The probe has opposed proximity and distal ends. A scale, located at the proximal end, defines an axis and presents indicia extending along the axis. A housing is slidably mounted to the scale. The shaft is attached to the housing and includes the tip. Relative movement between the housing and the scale causes the distal end to protrude from the tip a selected distance reflected by the indicia. The shaft is flexible. The shaft and probe may be selectively bent with respect to the axis in order to allow the scale to be adjusted and read from any desired perspective.

The scale is attached to the probe. A super-elastic nickel titanium connector optionally attaches the scale to the probe. The connector has a hole that accepts the proximal end of the probe, the scale having another hole that in turn receives the connector in a press fit, thus effecting the attachment between the scale and the probe.

Optionally, the probe and connector are both made of a nickel-titanium alloy.

Other objects and advantages of the invention will become apparent upon reading the following detailed description and upon reference to the drawings.

BRIEF DESCRIPTION OF THE DRAWINGS

FIG. 1 shows a front view of a novel depth gauge assembly embodying the present invention FIG. 2 shows a side view of the assembled depth gauge of FIG. 1.

DETAILED DESCRIPTION OF THE DRAWINGS

Figures 3, 4:
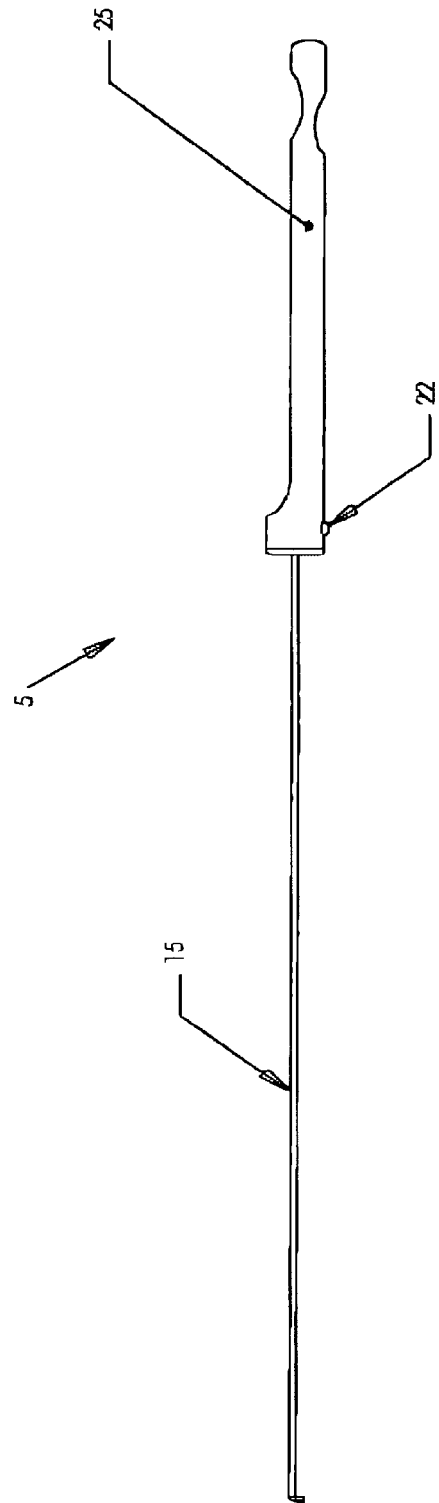
FIG. 3 shows an exploded side view of the probe connection to the depth gauge scale.
FIG. 4 shows a side view of the probe connection to the depth gauge after assembly
Figure 5:
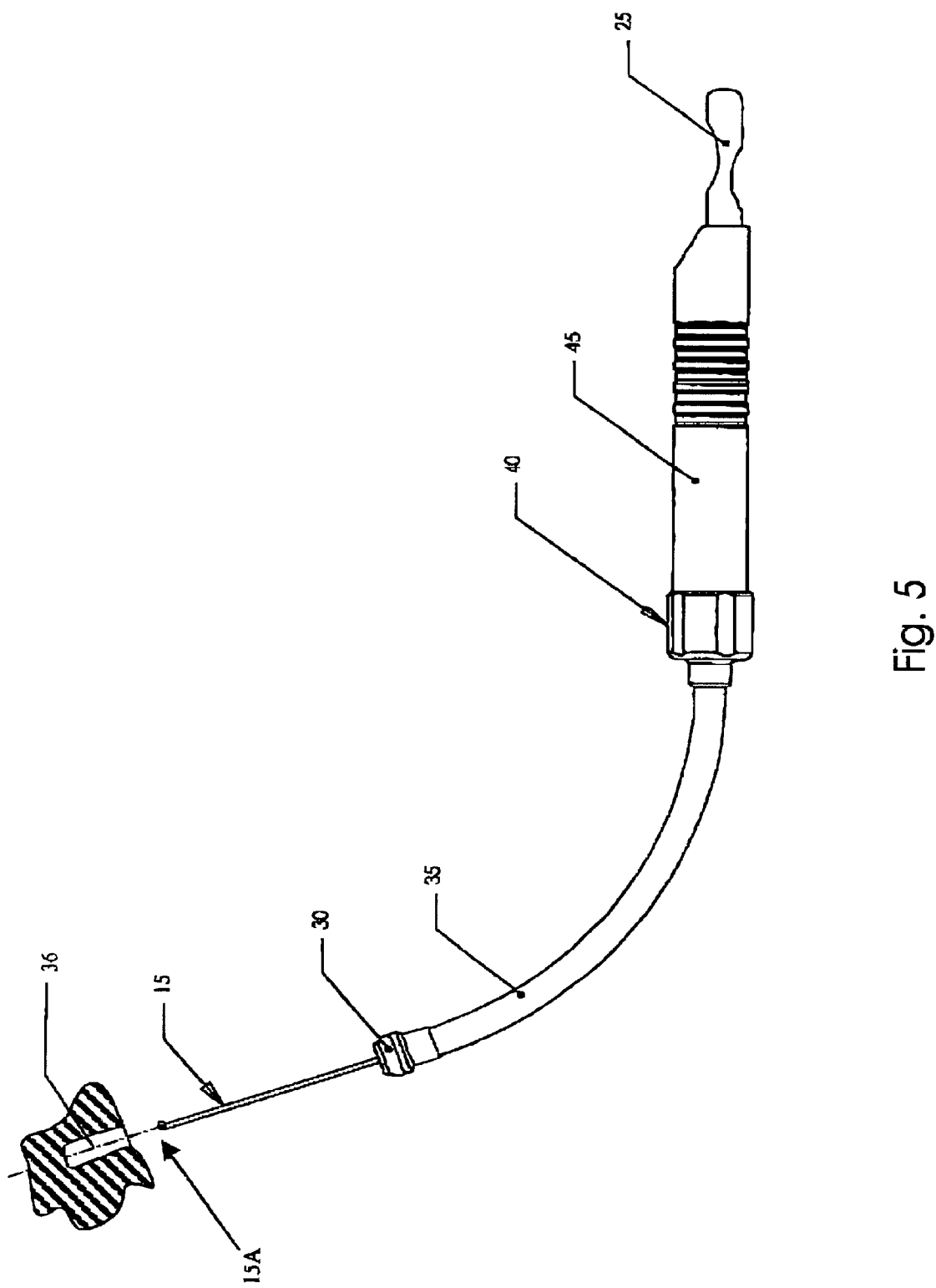
FIG. 5 shows a side view of the depth gauge assembly embodying the present invention with the flexible shaft in a typical configuration during use.

One preferred embodiment of the present invention is shown in FIGS. 1–5. Referring in particular to FIGS. 1–2, and 5, an assembled depth gauge 10 of the present invention can be found with a flexible shaft 35 attached to an adapter 40 at its proximal end, and a tip 30 at its distal end. The tip 30 is generally cylindrical in shape having an axis which is an extension of the axis of the flexible shaft 35. The tip 30 includes a proximal end 30A which attaches to the flexible shaft 35 and a distal end 30B which has a contoured shape that mates with a hole in an acetabular cup implant (shown in FIG. 5). The fit between the distal end of the tip of the measurement device and the acetabular cup allows the tip 30 to be fixed during measurement through the acetabular cup. The flexible shaft 35 also allows the device 10 to bend as shown in FIG. 5, for the measurement of blind holes 36. Protruding from the tip, a probe 15 presents itself at a set angle in relationship to the axis of the tip 30. This angle can be determined at the time of design—in this case, it was set at 0 degrees, therefore the probe 15 will always protrude from the tip 30 at 0 degrees. The bowed shape of the depth gauge 10 is unique to other existing designs, because the reading of the depth of a hole drilled through a hemispherical cup can be taken without difficulty no matter where the hole lies in respect to the hemisphere. This feature allows the user to place the tip 30 at the measurement location and orient the scale so that it can easily be adjusted and read from any angular orientation desired. Attached to the other end of the flexible shaft 35 is an adapter 40 which is threaded (threads not shown) onto the standard depth gauge housing 45. The assembly is further comprised of a scale 25 showing scale markings 50 and depth values 55. FIGS. 3–4 show the pre-assembly of the scale 25 with the super-elastic nickel titanium probe 15. There are several different ways to attach the probe. In FIG. 3 a super-elastic connector 20 is shown. The connector 20 has a hole in it (not shown) that accepts the probe 15. The connector 20 is then press fit into a hole (not shown) in the end of the scale 25. As the connector 20 is press fit into the hole in the connector 20 it contracts and grubs onto the probe 15. The pre-assembly is generally shown at 5 in FIG. 4. Also shown in FIGS. 3–4 is a spring-loaded ball 22 which is used to tension the scale 25 inside the housing 45 so that the components don't slip relative to one another once a measurement has been made.

FIG. 5 shows the measurement of a blind hole 36 in more detail. In this scenario, the flexible shaft 35 is curved and the distal end of the tip 30 faces the blind hole 36. The probe 15 extends from the tip to find the hole 36. The probe 15 includes an abutment 15A which abuts against an obstacle, such as the blind end of the hole 36. The probe 15 may now be retracted into the device 10 until the distal end of the tip 30 settles into the mouth of the blind hole 36, at which point the measurement is taken.

What is claimed is:

1. A measurement instrument for measuring blind holes in bone, the instrument comprising:
   an elongated probe made of a super-elastic alloy, having opposed proximal and distal ends;
   a scale located adjacent the proximal end of the probe, defining an axis and presenting indicia extending along the axis;
   an abutment on the distal end of the probe;
   a housing slidably mounted to the scale; and
   a shaft having a proximal and a distal end and at least surrounding the proximal end of the probe, the proximal end of the shaft attached to the housing and having a bone-engaging tip attached to the distal end of the shaft, the tip supporting a portion of the probe enclosed within it so as to guide the probe out of the tip at a predefined angle with respect to the distal end of the shaft,
   wherein relative movement between the housing and the scale causes the abutment on the distal end of the probe to extend out from the tip along a straight path a selected distance reflected by the indicia and along a predefined angle until it abuts against an obstacle such as an end of a hole to be measured.

2. The instrument of claim 1 wherein the shaft is flexible.

3. The instrument of claim 2 wherein the shaft and probe are selectively bent with respect to the axis allowing the scale to be adjusted and read form any desired perspective.

4. The instrument of claim 1 wherein the scale is attached to the probe.

5. The instrument of claim 4 further comprising a super-elastic connector that attaches the scale to the probe.

6. The instrument of claim 5 wherein the connector has a hole that accepts the proximal end of the probe, the scale having another hole that in turn receives the connector in a press fit, effecting the attachment between the scale and the probe.

7. The instrument of claim 1 wherein the probe protrudes from the tip in a direction coaxial with the distal end of the flexible shaft.

8. A measurement instrument for measuring blind holes in bone, the instrument comprising:
   an elongated probe made of a super-elastic alloy, having opposed proximal and distal ends;
   a scale located adjacent the proximal end of the probe, defining an axis and presenting indicia extending along the axis;
   an abutment on the distal end of the probe;
   a super-elastic connector that attaches the scale to the probe;
   a housing slidably mounted to the scale; and
   a flexible shaft having a proximal and a distal end and at least surrounding the proximal end of the probe, the proximal end of the shaft attached to the housing and having a bone-engaging tip attached to the distal end of the shaft, the tip supporting a portion of the probe enclosed within it so as to guide the probe out of the tip at a predefined angle with respect to the distal end of the flexible shaft, the shaft and probe being selectively bent so as to form a wide, smooth curve with respect to the axis,
   wherein relative movement between the housing and the scale causes the abutment on the distal end of the probe to extend out from the tip along a straight path a selected distance reflected by the indicia until it abuts against an obstacle such as an end of a hole to be measured, while allowing the scale to be adjusted and read from any desired perspective.

9. The instrument of claim 8 wherein the connector has a hole that accepts the proximal end of the probe, the scale having another hole that in turn receives the connector in a press fit, effecting the attachment between the scale and the probe.

10. The instrument of claim 8 wherein the flexible shaft is a flat wire coil.

11. The instrument of claim 8 wherein the flexible shaft is a round wire coil.

12. The instrument of claim 8 wherein either of the probe and connector is made of a nickel-titanium alloy.

13. A surgical measurement instrument for measuring blind holes in bone, the instrument comprising:
   an elongated probe made of a super-elastic alloy, having opposed proximal and distal ends;
   a scale located adjacent the proximal end of the probe, defining an axis and presenting indicia extending along the axis;
   an abutment on the distal end of the probe;
   a super-elastic connector that attaches the scale to the probe, the connector having a hole that accepts the proximal end of the probe, the scale having another hole that in turn receives the connector in a press fit, effecting an attachment between the scale and the probe;
   a housing slidably mounted to the scale; and
   a flexible shaft made of a wired coil having a proximal and a distal end, the proximal end and at least surrounding the proximal end of the probe, the proximal end of the shaft attached to the housing and having a bone-engaging tip attached to the distal end of the shaft, the tip supporting a portion of the probe enclosed within it so as to guide the probe out of the tip at a predefined angle with respect to the distal end of the flexible shaft, the probe protruding through the tip, the shaft and probe being selectively bent so as to form a wide, smooth curve with respect to the axis, wherein relative movement between the housing and the scale causes the abutment on the distal end or the probe to extend out from the tip along a straight path a selected distance reflected by the indicia until it abuts against an obstacle such as an end of a hole to be measured, while allowing the scale to be adjusted and read from any desired perspective.

14. The instrument of claim 13 wherein the probe protrudes from the tip in a direction perpendicular to the tip.

15. The instrument of claim 13 wherein either of the probe and connector is made of a nickel-titanium alloy.

* * * * *